US012566443B2

(12) United States Patent　　(10) Patent No.: US 12,566,443 B2
Koh et al.　　(45) Date of Patent:　Mar. 3, 2026

(54) ROBOT TRAVELING IN SPECIFIC SPACE AND CONTROL METHOD THEREOF

(71) Applicant: SAMSUNG ELECTRONICS CO., LTD., Suwon-si (KR)

(72) Inventors: Youngil Koh, Suwon-si (KR); Soonbeom Kwon, Suwon-si (KR); Seungbeom Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 192 days.

(21) Appl. No.: 18/370,493

(22) Filed: Sep. 20, 2023

(65) Prior Publication Data

US 2024/0069562 A1　Feb. 29, 2024

Related U.S. Application Data

(63) Continuation of application No. PCT/KR2023/009773, filed on Jul. 10, 2023.

(30) Foreign Application Priority Data

Aug. 26, 2022　(KR) ........................ 10-2022-0107830

(51) Int. Cl.
G05D 1/00　　(2024.01)
(52) U.S. Cl.
CPC .................................. G05D 1/0246 (2013.01)
(58) Field of Classification Search
CPC ..................................................... G05D 1/0246
See application file for complete search history.

(56) References Cited

U.S. PATENT DOCUMENTS 8,195,333 B2　6/2012　Ziegler et al.
9,452,525 B2　9/2016　Ziegler et al.
(Continued)

FOREIGN PATENT DOCUMENTS

JP　　2019-508665 A　　3/2019
JP　　2019-219736 A　　12/2019
(Continued)

OTHER PUBLICATIONS

International Search Report (PCT/ISA/210) issued Oct. 24, 2023 by the International Searching Authority in International Application No. PCT/KR2023/009773.
(Continued)

*Primary Examiner* — Hunter B Lonsberry
*Assistant Examiner* — Harrison Heflin
(74) *Attorney, Agent, or Firm* — Sughrue Mion, PLLC

(57) ABSTRACT

A robot includes: a sensor configured to detect an external environment within a viewing zone of the a sensor; memory storing information on a travel space including a privacy protection zone; and a processor configured to: identify whether the viewing zone will be within a predetermined distance from the privacy protection zone while the robot travels along a travel path in the travel space; based on identifying that the viewing zone will be within the predetermined distance, determine whether the viewing zone will overlap with the privacy protection zone based on the travel path; and based on determining that the viewing zone will overlap with the privacy protection zone, change a heading direction of the robot from a first heading direction to a second heading direction to prevent the viewing zone from overlapping with the privacy protection zone.

18 Claims, 13 Drawing Sheets

(56)  References Cited

U.S. PATENT DOCUMENTS

| | | | |
|---|---|---|---|
| 9,983,592 | B2 | 5/2018 | Hong et al. |
| 10,642,274 | B2 | 5/2020 | Storfer et al. |
| 10,728,505 | B2 | 7/2020 | Sue |
| 11,151,281 | B2 | 10/2021 | Lai |
| 12,187,186 | B2 * | 1/2025 | Watano ................... B60Q 1/14 |
| 2014/0095007 | A1 | 4/2014 | Angle et al. |
| 2017/0203446 | A1 | 7/2017 | Dooley et al. |
| 2017/0225336 | A1 | 8/2017 | Deyle et al. |
| 2019/0127034 | A1 * | 5/2019 | Larson ................... G01S 17/08 |
| 2019/0387203 | A1 * | 12/2019 | Sue ........................ H04N 7/185 |
| 2020/0026071 | A1 * | 1/2020 | Bao ..................... G02B 26/101 |
| 2020/0036886 | A1 * | 1/2020 | Kim ....................... G05D 1/101 |
| 2020/0257821 | A1 | 8/2020 | Lai |
| 2020/0285248 | A1 | 9/2020 | Kim et al. |
| 2022/0171973 | A1 | 6/2022 | Cui et al. |
| 2022/0219311 | A1 * | 7/2022 | Duthaler ............... G05D 1/645 |
| 2022/0230534 | A1 * | 7/2022 | Sikora ................... G08C 23/04 |
| 2023/0281528 | A1 * | 9/2023 | Hayashi ........... G06Q 10/06312 |
| | | | 705/7.22 |
| 2023/0315121 | A1 * | 10/2023 | Ito ......................... G05D 1/247 |
| | | | 701/23 |

FOREIGN PATENT DOCUMENTS

| | | | |
|---|---|---|---|
| JP | 2020-32014 | A | 3/2020 |
| KR | 10-2019-0002152 | A | 1/2019 |
| KR | 10-2071575 | B1 | 1/2020 |
| KR | 10-2020-0115696 | A | 10/2020 |

OTHER PUBLICATIONS

Written Opinion (PCT/ISA/237) issued Oct. 24, 2023 by the International Searching Authority in International Application No. PCT/KR2023/009773.

Communication dated Aug. 20, 2025 issued by the European Patent Office in European Patent Application No. 23857554.2.

* cited by examiner

<u>100</u>

ROBOT TRAVELING IN SPECIFIC SPACE AND CONTROL METHOD THEREOF

CROSS-REFERENCE TO RELATED APPLICATIONS

This application is a bypass continuation of International Application No. PCT/KR2023/009773, filed on Jul. 10, 2023, which is based on and claims priority to Korean Patent Application No. 10-2022-0107830, filed Aug. 26, 2022, in the Korean Intellectual Property Office, the disclosures of which are incorporated by reference herein in their entireties.

BACKGROUND

1. Field

The disclosure relates to a robot traveling in a specific space and a control method thereof, and more particularly, to a robot adjusting a heading direction of the robot in consideration of a privacy protection zone, and a control method thereof.

2. Description of Related Art

Various types of electronic devices have been developed and supplied in accordance of development of electronic technology, and technology development for a robot providing a service to a user or the like is recently becoming more active. A robot traveling in a specific space for providing a service to a user needs to travel in consideration of various types of information on its travel path to provide a prompt service to the user.

In order to travel in consideration of an object existing on the travel path, the robot may acquire an image around the robot through an image acquisition sensor. In this case, user privacy may not be protected, thus causing user anxiety. Accordingly, there is a need for a method to relieve the user anxiety by allowing the robot to travel in a specific space while protecting the user privacy.

SUMMARY

In accordance with an aspect of the disclosure, a robot includes: at least one sensor configured to detect an external environment within a viewing zone of the at least one sensor; at least one memory storing information on a travel space including a privacy protection zone; and at least one processor configured to: identify whether the viewing zone of the at least one sensor will be within a predetermined distance from the privacy protection zone while the robot travels along a travel path in the travel space, based on identifying that the viewing zone of the at least one sensor will be within the predetermined distance, determine whether the viewing zone of the at least one sensor will overlap with the privacy protection zone based on the travel path, and based on determining that the viewing zone of the at least one sensor will overlap with the privacy protection zone, change a heading direction of the robot from a first heading direction to a second heading direction to prevent the viewing zone of the at least one sensor from overlapping with the privacy protection zone.

The at least one processor may be further configured to: based on identifying that the viewing zone of the at least one sensor will be within the predetermined distance, identify an azimuth of the privacy protection zone based on the heading direction of the robot while the robot travels, and change the heading direction of the robot to cause the azimuth of the privacy protection zone to be greater than or equal to a viewing angle of the at least one sensor.

The robot may further include a driver configured to rotate a portion of the robot in which the at least one sensor is provided, and the at least one processor may be further configured to control the driver to rotate the portion of the robot to orient the at least one sensor in the second heading direction while maintaining the travel path of the robot.

The robot may further a driver configured to drive movement of the robot, and the at least one processor may be further configured to control the driver to change the travel path of the robot to correspond to the second heading direction.

The robot may further include a light emitter, and the at least one processor may be further configured to: identify an emission angle for emitting light to an area corresponding to the viewing zone of the at least one sensor, and control the light emitter to emit the light at the emission angle to the area corresponding to the viewing zone of the at least one sensor, for distinguishing the viewing zone of the at least one sensor from other zones.

The at least one processor may be further configured to: identify the privacy protection zone based on a user setup history, and update the information on the travel space to include the identified privacy protection zone during a specific time period included in the user setup history.

The robot may further include a speaker, and the at least one processor may be further configured to control the speaker to, based on identifying that the viewing zone of the at least one sensor will be within the predetermined distance, provide a privacy violation notification.

The robot may further include a display, and the at least one processor may be further configured to, based on determining that the viewing zone of the at least one sensor will overlap with the privacy protection zone and determining that a change of heading direction will not prevent the viewing zone of the at least one sensor from overlapping with the privacy protection zone, control the robot to continue to move along the travel path, process an image obtained by the at least one sensor to obscure a portion of the image corresponding to the privacy protection zone, and display the processed image on the display.

The at least one sensor includes at least one of a camera sensor, a time of flight (ToF) sensor, a thermal imaging sensor, or a light detection and ranging (LiDAR) sensor.

According to an aspect of the disclosure, a method of controlling a robot includes: identifying whether a viewing zone of at least one sensor of the robot will be within a predetermined distance from a privacy protection zone included in a travel space while the robot travels along a travel path in the travel space; based on identifying that the viewing zone of the at least one sensor will be within the predetermined distance, determining whether the viewing zone of the at least one sensor will overlap with the privacy protection zone based on the travel path; and based on determining that the viewing zone of the at least one sensor will overlap with the privacy protection zone, changing a heading direction of the robot from a first heading direction of the robot to a second heading direction of the robot to prevent the viewing zone of the at least one sensor from overlapping with the privacy protection zone.

The changing the heading direction of the robot may include: based on identifying that the viewing zone of the at least one sensor is within the predetermined distance, identifying an azimuth of the privacy protection zone based on the heading direction of the robot while the robot travels; and changing the heading direction of the robot to cause the azimuth of the privacy protection zone to be greater than or equal to a viewing angle of the at least one sensor.

The method may further include controlling a driver of the robot to rotate a portion of the robot in which the at least one sensor is provided to orient the at least one sensor in the second heading direction while maintaining the travel path of the robot.

The method may further include controlling a driver of the robot to change the travel path of the robot to correspond to the second heading direction.

The method may further include: identifying an emission angle for emitting light to an area corresponding to the viewing zone of the at least one sensor; and emitting the light at the emission angle to the area corresponding to the viewing zone of the at least one sensor for distinguishing the viewing zone of the at least one sensor.

The method may further include: identifying the privacy protection zone based on a user setup history, and updating information on the travel space to include the identified privacy protection zone during a specific time period included in the user setup history.

The method may further include, based on identifying that the viewing zone of the at least one sensor is within the predetermined distance, providing a privacy violation notification through a speaker.

The method may further include, based on determining that the viewing zone of the at least one sensor will overlap with the privacy protection zone and determining that a change of heading direction will not prevent the viewing zone of the at least one sensor from overlapping with the privacy protection zone, controlling the robot to continue to move along the travel path, processing an image obtained by the at least one sensor to obscure a portion of the image corresponding to the privacy protection zone, and displaying the processed image on a display.

According to an aspect of the disclosure, a non-transitory computer-readable medium stores instructions, which are executable by at least one processor cause the at least one processor to execute a method of controlling a robot, the method including: identifying whether a viewing zone of at least one sensor of the robot will be within a predetermined distance from a privacy protection zone included in a travel space while the robot travels along a travel path in the travel space; based on identifying that the viewing zone of the at least one sensor will be within the predetermined distance, determining whether the viewing zone of the at least one sensor will overlap with the privacy protection zone based on the travel path; and based on determining that the viewing zone of the at least one sensor will overlap with the privacy protection zone based on the travel path, changing a heading direction of the robot from a first heading direction of the robot to a second heading direction to prevent the viewing zone of the at least one sensor from overlapping with the privacy protection zone.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, certain embodiments of the disclosure is described in detail with reference to the accompanying drawings.

Terms used in the specification are briefly described, and the disclosure is then described in detail General terms that are currently widely used are selected as terms used in embodiments of the disclosure in consideration of their functions in the disclosure, and may be changed based on the intention of those skilled in the art or a judicial precedent, the emergence of a new technique, and the like. In addition, in a specific case, terms arbitrarily chosen by an applicant may exist. In this case, the meanings of such terms are mentioned in detail in corresponding description portions of the disclosure. Therefore, the terms used in the embodiments of the disclosure need to be defined on the basis of the meanings of the terms and the contents throughout the disclosure rather than simple names of the terms.

In the disclosure, an expression "have," "may have," "include," "may include" or the like, indicates the existence of a corresponding feature (for example, a numerical value, a function, an operation or a component such as a part), and does not exclude the existence of an additional feature.

The expression "at least one of A or B" may indicate either "A," B," or "both of A and B."

Expressions "first," "second," and the like, used in the disclosure may indicate various components regardless of a sequence or importance of the components. These expressions are used only to distinguish one component from another component, and do not limit the corresponding components.

In case that any component (for example, a first component) is mentioned to be "(operatively or communicatively) coupled with/to" or "connected to" another component (for example, a second component), it is to be understood that any component may be directly coupled to another component or may be coupled to another component through still another component (for example, a third component).

A term of a singular number may include its plural number unless explicitly indicated otherwise in the context. It is to be understood that a term "include," "formed of," or the like used in the application specifies the presence of features, numerals, steps, operations, components, parts, or combinations thereof, mentioned in the specification, and does not preclude the presence or addition of one or more other features, numerals, steps, operations, components, parts, or combinations thereof.

In the embodiments, a "module" or a "~er/~or" may perform at least one function or operation, and be implemented by hardware or software or be implemented by a combination of hardware and software. In addition, a plurality of "modules" or a plurality of "~ers/~ors" may be integrated in at least one module and implemented by at least one processor except for a "module" or a "~er/or" that needs to be implemented by specific hardware.

Figure 1:
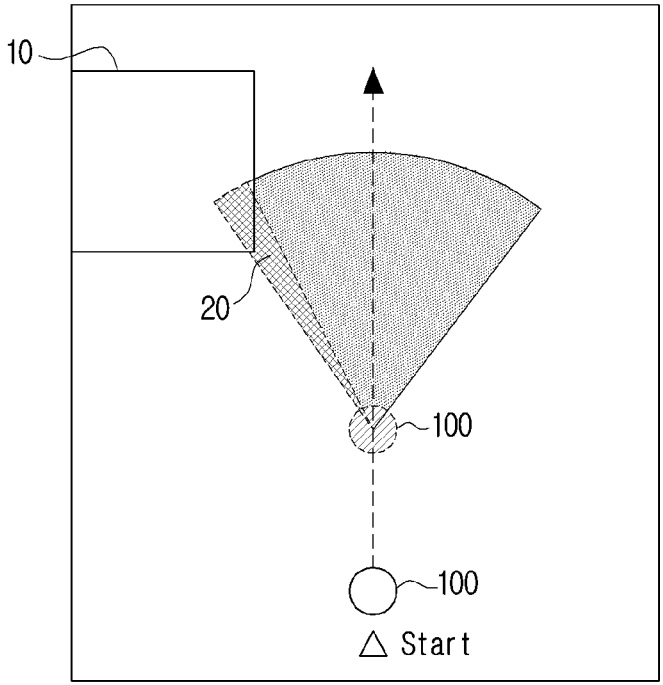
FIG. 1 is a view for schematically explaining a control method of a robot according to one or more embodiments.

FIG. 1 is a view for schematically explaining a control method of a robot according to one or more embodiments.

Referring to FIG. 1, a robot 100 may travel in a specific space and provide a service to a user according to one or more embodiments. The robot 100 according to one or more embodiments, may be a home service robot performing laundry, cleaning, errands, or the like, but is not limited thereto, and may be a robot performing a specific service (e.g., at least one of services such as serving, guidance, or delivery).

According to one or more embodiments, the robot 100 may pre-store information on a map of a travel space to travel the space, and may travel the space by performing path generation based thereon. According to one or more embodiments, the robot 100 may generate a minimum time path or a minimum distance path to reach a destination based on the pre-stored map information.

In case that the robot 100 travels along the generated path according to one or more embodiments, the robot 100 may detect a zone around the robot 100 (or a viewing zone of a sensor) through the sensor such as a camera to identify an object on its travel path or a shape of the zone around the robot.

According to one or more embodiments, the travel space may include a privacy protection zone 10 for protecting user privacy. As shown in FIG. 1, a viewing zone 20 that may violate the privacy protection zone 10 may exist during the travel of the robot 100. In this case, the user's privacy protection zone may not be protected any longer, thus causing user anxiety.

Accordingly, the description hereinafter describes various embodiments in which user reliability may be secured by protecting user privacy in such a manner that a heading direction of the robot 100 is adjusted while a visible privacy-protection motion is simultaneously performed not to thus violate the privacy protection zone.

Figure 2:
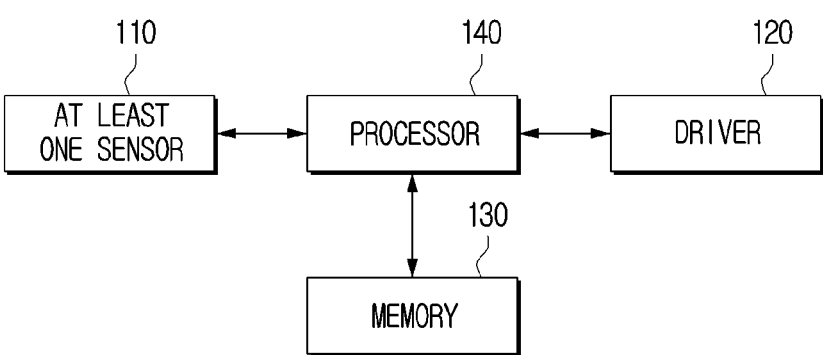
FIG. 2 is a block diagram showing a configuration of a robot according to one or more embodiments.

FIG. 2 is a block diagram showing a configuration of a robot according to one or more embodiments.

Referring to FIG. 2, a robot 100 may include at least one sensor 110, a driver 120, a memory 130, and at least one processor 140.

At least one sensor 110 (hereinafter referred to as a sensor) may include a plurality of sensors of various types. The sensor 110 may measure a physical quantity or detect an operation state of the robot 100, and convert the measured or detected information into an electrical signal. The sensor 110 may include a camera, and the camera may include a lens that focuses visible light and other optical signals reflected by an object and received by an image sensor, and the image sensor which may detect visible light and other optical signals. Here, the image sensor may include a two-dimensional (2D) pixel array classified into a plurality of pixels. The camera according to one or more embodiments may be implemented as a depth camera. In addition, according to one or more embodiments, the sensor 110 may include a thermal image sensor that reads a shape as well as a distance sensor such as a light detection and ranging (LiDAR) sensor or a time of flight (ToF) sensor.

The driver 120 is a device that may allow the robot 100 to travel. The driver 120 may adjust the travel direction and/or travel speed of the robot under control of a processor 140. The driver 120 according to one or more embodiments may include: a power generator (e.g., gasoline engine, diesel engine, liquefied petroleum gas (LPG) engine, or electric motor, classified based on a fuel (or energy source) used therein) that generates power for the robot 100 to travel; a steering device (e.g., manual steering, hydraulics steering, or electronic control power steering (EPS)) that controls the travel direction; and a travel device (e.g., wheel or propeller) that allows the robot 100 to travel by power. Here, the driver 120 may be modified based on a travel type (e.g., wheel type, walking type, or flight type) of the robot 100.

The memory 130 may store data necessary for the various embodiments of the disclosure. The memory 130 may be implemented as a memory embedded in the robot 100, or implemented as a memory detachable from robot 100, based on a data storage purpose. For example, data for driving the robot 100 may be stored in the memory embedded in the robot 100, and data for an extension function of the robot 100 may be stored in the memory detachable from the robot 100. The memory embedded in the robot 100 may be implemented as at least one of a volatile memory (for example, a dynamic random access memory (DRAM), a static RAM (SRAM), or a synchronous dynamic RAM (SDRAM)), a non-volatile memory (for example, an one time programmable read only memory (OTPROM), a programmable ROM (PROM), an erasable and programmable ROM (EPROM), an electrically erasable and programmable ROM (EEPROM), a mask ROM, or a flash ROM), a flash memory (for example, a NAND flash, or a NOR flash), a hard drive, or a solid state drive (SSD)). In addition, the memory detachable from the robot 100 may be implemented in the form of a memory card (for example, a compact flash (CF), a secure digital (SD), a micro secure digital (Micro-SD), a mini secure digital (Mini-SD), an extreme digital (xD), or a multi-media card (MMC)), or an external memory which may be connected to a universal serial bus (USB) port (for example, a USB memory).

According to one or more embodiments, the memory 130 may store map information on a travel space including a privacy protection zone. Here, the travel space may be a space where the robot 100 currently travels or is scheduled to travel, and the privacy protection zone may be a specific zone on a map (i.e. map of the travel space) of a space requiring privacy protection in the travel space.

At least one processor 140 (hereinafter referred to as "processor") may be electrically connected to at least one sensor 110, the driver 120, and the memory 130 to control overall operations of the robot 100. The processor 140 may include one or more processors. In detail, the processor 140 may perform an operation of the robot 100 according to the various embodiments of the disclosure by executing at least one instruction stored in the memory.

According to one or more embodiments, the processor 140 may be implemented as a digital signal processor (DSP) for processing a digital video signal, a microprocessor, a graphics processing unit (GPU), an artificial intelligence (AI) processor, or a neural processing unit (NPU), or a timing controller (T-CON). However, the processor is not limited thereto, and may include at least one of a central processing unit (CPU), a micro controller unit (MCU), a micro processing unit (MPU), a controller, an application processor (AP), a communication processor (CP) or an advanced reduced instruction set computer (RISC) machines (ARM) processor, or may be defined by this term. In addition, the processor 140 may be implemented in a system-on-chip (SoC) or a large scale integration (LSI) in which a processing algorithm is embedded, or may be implemented in the form of an application specific integrated circuit (ASIC) or a field programmable gate array (FPGA).

According to one or more embodiments, the processor 140 may identify whether a viewing zone of at least one sensor 110 (hereinafter referred to as a sensor) approaches the privacy protection zone. According to one or more embodiments, the processor 140 may identify whether the viewing zone approaches within a predetermined distance (e.g., a critical distance) from the privacy protection zone from a current position of the robot 100 while the robot 100 travels.

Here, the privacy protection zone may be the specific zone on the map (i.e., map of the travel space) of the space requiring the privacy protection in the travel space. According to one or more embodiments, the processor 140 may acquire the map information on the travel space including the privacy protection zone based on a user input for setting the privacy protection zone. However, embodiments of the disclosure are not limited thereto, and the map information may be pre-stored in the memory 130 during an initial setup. In this case, the privacy protection zone may be the specific zone (e.g., bedroom or kids room) in the travel space, and is not limited thereto. A detailed description thereof is provided with reference to FIGS. 4 and 9.

The viewing area of the sensor 110 may be a zone on the map (i.e. map of the travel space) of a space detected by the sensor 110 of the robot 100. Here, according to one or more embodiments, the viewing zone of the sensor 110 may be an actual detection range of the sensor 110, but is not limited thereto, and may be different from the actual detection range.

According to one or more embodiments, the viewing zone may have a different size (or range) based on a type of sensor 110, and information on the viewing zone including information on a size (or range) of the viewing zone may be pre-stored in the memory 130.

For example, the processor 140 may calculate a minimum distance between the viewing zone of the sensor 110 and the privacy protection zone, and identify whether a size of the calculated minimum distance is less than a predetermined size value of the predetermined distance. According to one or more embodiments, the minimum distance may be a Euclidean distance, and the minimum distance may be a distance between points each having a minimum value among distances between any point in the viewing zone and any point in the privacy protection zone. Here, the predetermined distance may be a pre-stored value provided during the initial setup, but is not limited thereto, and may be changed based on the user input.

According to one or more embodiments, the processor 140 may predict whether the viewing zone of the sensor 110 is going to violate the privacy protection zone. According to one or more embodiments, the processor 140 may predict whether the viewing zone of the sensor 110 is going to violate the privacy protection zone based on a travel path of the robot 100 in a scenario where the viewing zone of the sensor 110 is identified as approaching within the predetermined distance from the privacy protection zone from the current position of the robot 100 while the robot 100 travels.

For example, the processor 140 may first identify a short-term target point in the travel path of the robot 100, and predict a viewing zone that is changed while the robot 100 travels to the short-term target point. That is, according to one or more embodiments, the processor 140 may predict the viewing zone as it is changed by the travel of the robot 100 in a scenario where the robot 100 travels to the short-term target point.

The short-term target point is a point on the travel path, and may be a point identified by the robot 100 as a short-term travel goal. According to one or more embodiments, the short-term target point may be a point away from the current position of the robot 100 by a predetermined distance along the travel path. Alternatively, the short-term target point may be a point on the travel path that the robot 100 in the travel is predicted to reach in a scenario where the robot 100 travels for a predetermined time along the travel path from its current position. Here, each of the predetermined distance or the predetermined time may be a value stored during the initial setup, but is not limited thereto, and may be changed based on the user input.

For example, the processor 140 may predict the viewing zone of the sensor 110 as it will be changed if the robot 100 travels to the short-term target point. The processor 140 may predict that the viewing zone of the sensor 110 is going to violate the privacy protection zone in a scenario where a zone included in the privacy protection zone is identified as existing among the predicted viewing zones by comparing the predicted viewing zone and the privacy protection zone with each other.

According to one or more embodiments, the processor 140 may adjust the heading direction of the robot 100 based on first position information of the privacy protection zone and second position information of the viewing zone of the sensor 110, on the map. Here, the first position information may be coordinate information corresponding to a position (or range) of the privacy protection zone on the travel map, and the second position information may be coordinate information corresponding to a position (or range) of the viewing zone on the travel map.

The heading direction of the robot 100 may be a direction in which the sensor 110 included in the robot 100 is currently heading or facing based on a center point of the robot 100. According to one or more embodiments, the viewing zone of the sensor 110 may have a sector shape, and in this case, the heading direction of the robot 100 may be a direction that is half of a central angle of the sector corresponding to the viewing zone. The heading direction may be different from the travel direction, which is described in detail with reference to FIGS. 6 and 7.

According to one or more embodiments, in case that the viewing zone of the sensor 110 is predicted to violate the privacy protection zone, the processor 140 may adjust the heading direction of the robot 100 for the viewing zone of the sensor 110 not to violate the privacy protection zone based on the first position information of the privacy protection zone on the map and the second position information of the viewing zone of the sensor 110 based on the heading direction of the robot on the map.

For example, the processor 140 may ensure that the viewing zone does not violate the privacy protection zone by identifying an azimuth of the privacy protection zone based on the heading direction of the robot 100 based on the first position information, and adjusting the heading direction of the robot 100 for the azimuth of the privacy protection zone to be greater than or equal to a viewing angle of the sensor 110 based on the second position information. Here, the azimuth of the privacy protection zone may be an angle between a straight line connecting the center point of the robot 100 with the point in the privacy protection zone on the map and the heading direction of the robot 100. The viewing angle of the sensor 110 may indicate a detectable angle size of the viewing zone based on the center point of the robot 100 on the map. A detailed description thereof is provided with reference to FIGS. 5A to 5C.

According to one or more embodiments, the processor 140 may control the driver 120 based on the adjusted heading direction. According to one or more embodiments, the processor 140 may control the driver 120 for the robot 100 to travel in the adjusted heading direction in a scenario where the heading direction of the robot 100 is adjusted for the viewing zone of the sensor 110 not to violate the privacy protection zone.

Accordingly, the robot 100 may adjust the heading direction to avoid the privacy protection zone, and provide the user with a visible privacy protection motion of the robot 100, thereby securing the user reliability.

Figure 3:
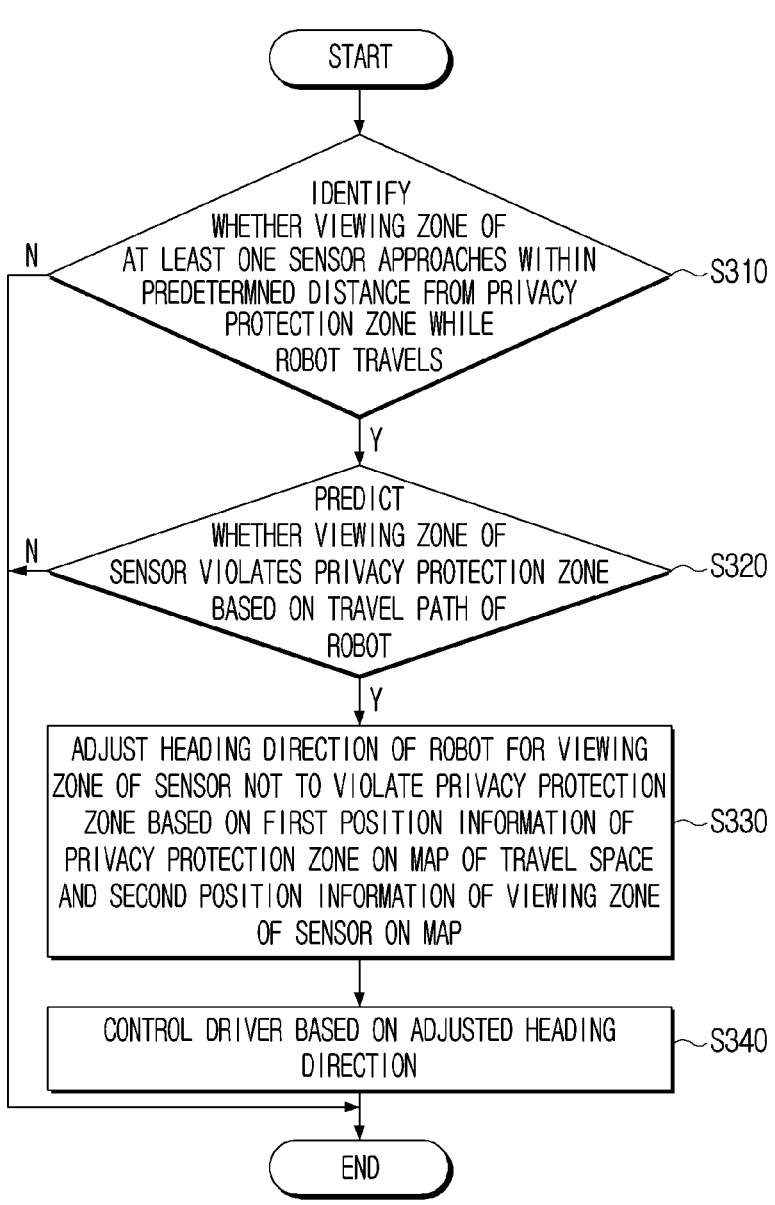
FIG. 3 is a flowchart showing a method of a robot traveling in a specific space according to one or more embodiments.

FIG. 3 is a flowchart showing a method of a robot 100 traveling in the specific space according to one or more embodiments.

The control method according to one or more embodiments may include identifying whether the viewing zone of at least one sensor 110 approaches within the predetermined distance from the privacy protection zone while the robot 100 travels (S310). In the control method according to one or more embodiments, the minimum distance between the viewing zone of the sensor 110 and the privacy protection zone may be calculated, and a determination of whether the size of the calculated minimum distance is less than the predetermined size value of the predetermined distance may be identified.

For example, in the control method, a distance between the viewing zone and the privacy protection zone may be calculated as 2.9 meter (m) by calculating a distance between any point in the viewing zone of the sensor 110 and any point in the privacy protection zone, and a size of the calculated minimum distance may be identified as less than 3 m, which is the predetermined distance.

However, embodiments of the disclosure are not limited thereto. For example, in the control method, the minimum distance between the robot 100 and the privacy protection zone may be calculated based on position coordinates of the robot 100 in a space and the position coordinates of the privacy protection zone, on the map.

Next, the control method according to one or more embodiments may include predicting whether the viewing zone of the sensor 110 violates the privacy protection zone based on the travel path of the robot 100 (S320).

In the control method according to one or more embodiments, the viewing zone that is changed while the robot 100 travels to the short-term target point may first be predicted in a scenario where the viewing zone of the sensor 110 is identified as approaching within 3 m, which is the predetermined distance from the privacy protection zone, from the current position of the robot 100 while the robot 100 travels. Here, the short-term target point may be a point that is a predetermined distance (e.g., 4 m) along the travel path away from the current position of the robot.

In the control method according to one or more embodiments, the viewing zone of the sensor 110 may be predicted to violate the privacy protection zone in a scenario where a zone included in the privacy protection zone is identified as existing among the predicted viewing zones by comparing the predicted viewing zone and the privacy protection zone with each other.

Next, the control method according to one or more embodiments may include adjusting the heading direction of the robot such that the viewing zone of the sensor does not violate the privacy protection zone based on the first position information of the privacy protection zone on the map of the travel space and the second position information of the viewing zone of the sensor 110 on the map (S330).

In the control method according to one or more embodiments, the azimuth of the privacy protection zone may be identified based on the heading direction of the robot 100 based on the first position information. For example, in the control method, a minimum angle among angles between any point in the privacy protection zone and the heading direction based on the first position information may be identified as the azimuth of the privacy protection zone.

Next, in the control method according to one or more embodiments, the viewing angle of the sensor 110 may be identified based on the second position information, and the heading direction of the robot 100 may be adjusted such that the azimuth of the identified privacy protection zone is greater than or is equal to the viewing angle of the sensor 110. For example, it may be ensured that the viewing zone does not violate the privacy protection zone by adjusting the azimuth of the privacy protection zone to be greater than or equal to the viewing angle of the sensor 110 in a scenario where the azimuth of the privacy protection zone is identified as 200 based on the heading direction of the robot 100 based on the first position information and the viewing angle is identified as 300 based on the second position information.

Next, the control method according to one or more embodiments may include controlling the driver 120 based on the adjusted heading direction (S340). In the control method according to one or more embodiments, the driver 120 may be controlled for the robot 100 to travel in the adjusted heading direction in a scenario where the heading direction of the robot 100 is adjusted such that the azimuth of the privacy protection zone is greater than or equal to the viewing angle of the sensor 110.

Figure 4:
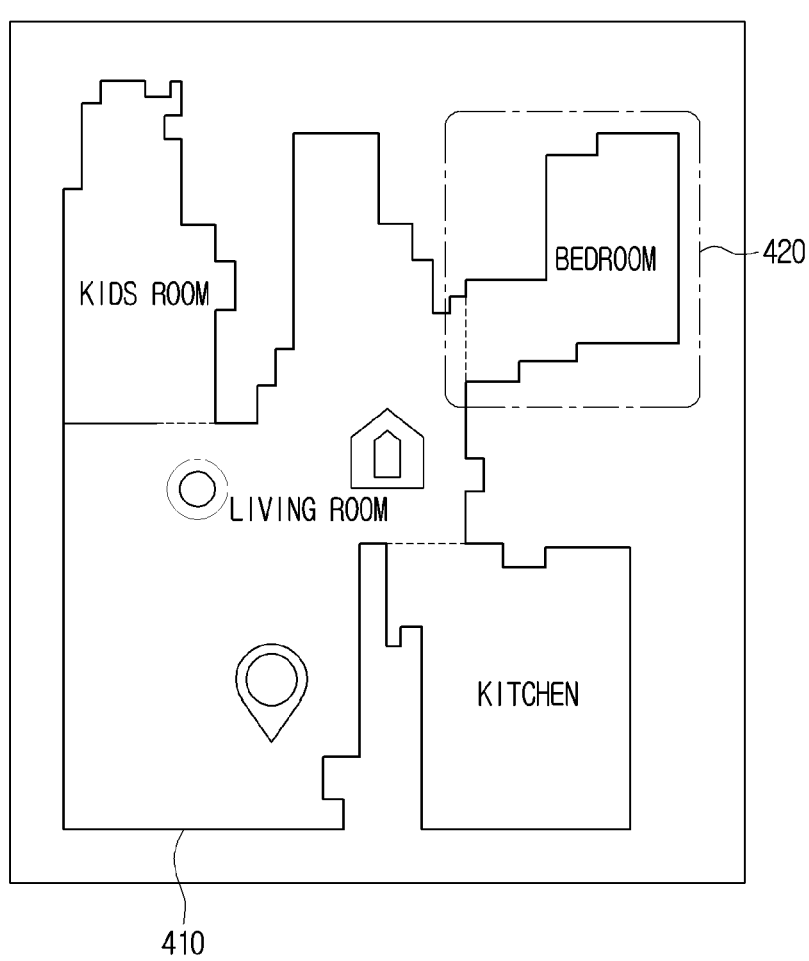
FIG. 4 is a view for explaining map information on a travel space including a privacy protection zone according to one or more embodiments.

FIG. 4 is a view for explaining map information on a travel space including a privacy protection zone according to one or more embodiments.

Referring to FIG. 4, according to one or more embodiments, map information 410 on the travel space may be stored in the memory 130. According to one or more embodiments, the map of the travel space may be a two-dimensional map of the space where the robot 100 travels. The map of the travel space may include a plurality of cells (or grids), and the travel space may be classified into at least one of occupied cells, free cells, or unknown cells.

According to one or more embodiments, the occupied cell may be an object in the travel space, and the free cell may be a space where an object is not positioned in the travel space. According to one or more embodiments, the object may be a column, a table, a chair, a wall, or the like, in the travel space, but is not limited thereto.

According to one or more embodiments, the map information 410 on the travel space may include information on the privacy protection zone. According to one or more embodiments, the processor 140 may update the map information on the travel space for a map of the travel space to include the privacy protection zone based on a received signal in a scenario where a signal corresponding to the privacy protection zone is received from the user through a user interface or a communication interface. In this case, according to one or more embodiments, the processor 140 may identify a specific zone as the privacy protection zone by updating the cell corresponding to the specific zone in the travel space as the cell corresponding to the privacy protection zone (or the privacy protection zone cell) in a scenario where the user input is received to specify the specific zone in the travel space as the privacy protection zone.

For example, as shown in FIG. 4, the processor 140 may update a cell included in a specific zone 420 corresponding to a received user input as the privacy protection zone cell in a scenario where the user input for specifying the specific zone 420 on a bedroom side as the privacy protection zone is received by the robot 100 through the user interface or the communication interface. Accordingly, the processor 140 may acquire the map of the travel space including the privacy protection zone 420.

However, the privacy protection zone is not limited thereto, and the privacy protection zone may be a value stored during the initial setup. That is, the map information on the travel space including the privacy protection zone may be stored in the memory 130 during the initial setup.

Figure 5A:
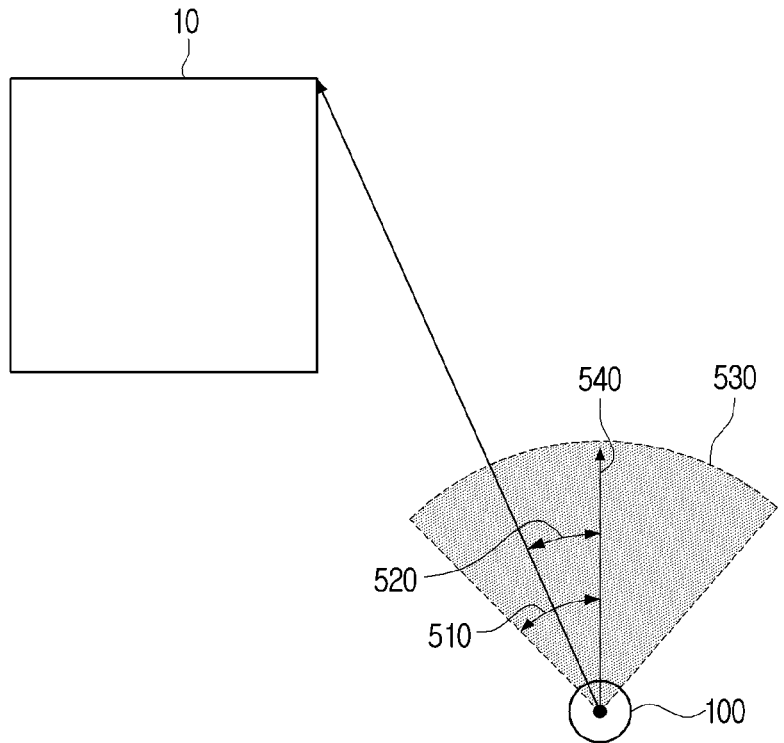
FIGS. 5A to 5C are views for explaining a method of adjusting a heading direction of the robot according to one or more embodiments.
Figure 5B:
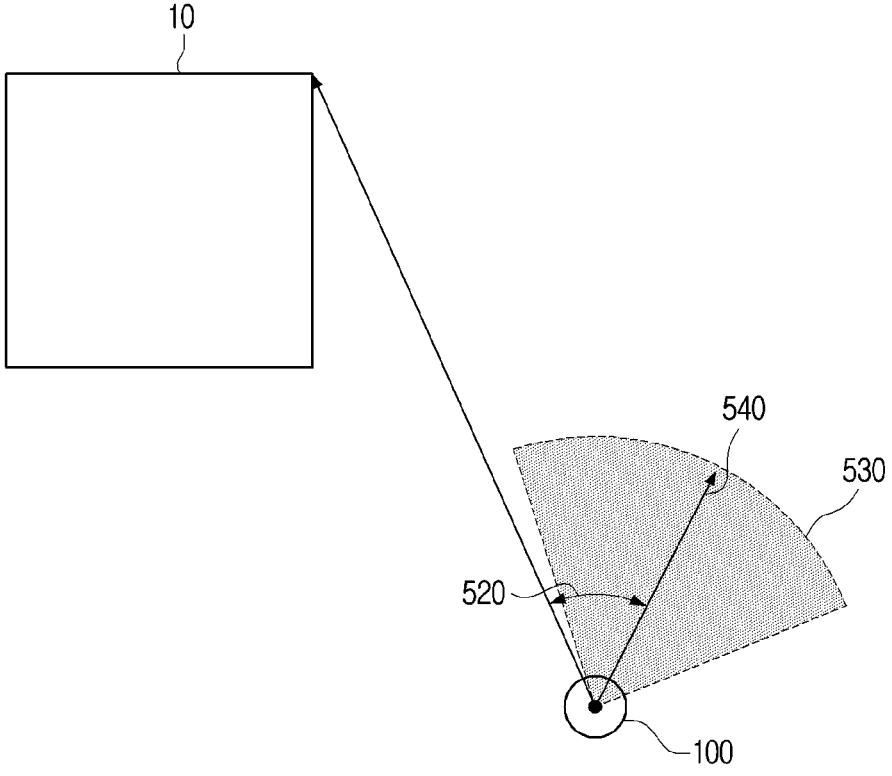
Figure 5C:
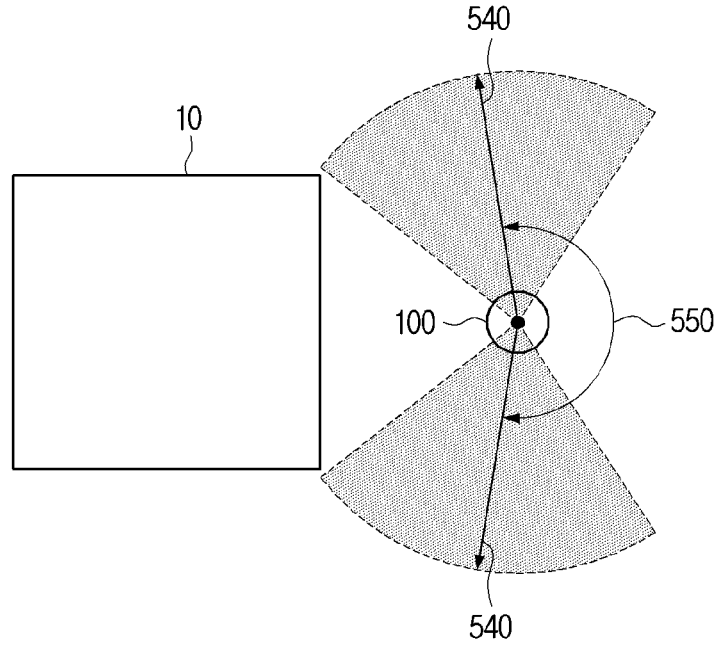

FIGS. 5A to 5C are views for explaining a method of adjusting the heading direction of the robot according to one or more embodiments.

According to one or more embodiments, in a scenario where the viewing zone of the sensor 110 is predicted to violate the privacy protection zone, the processor 140 may adjust the heading direction of the robot 100 such that the viewing zone of the sensor 110 does not violate the privacy protection zone based on the first position information of the privacy protection zone on the map and the second position information of the viewing zone of the sensor 110 based on the heading direction of the robot on the map.

According to one or more embodiments, the processor 140 may identify the azimuth of the privacy protection zone based on the first position information of the privacy protection zone and the heading direction, and identify the viewing angle of the sensor based on the second position information of the viewing zone. Next, the processor 140 may adjust the heading direction of the robot by comparing the identified azimuth and viewing angle with each other for the azimuth to be greater than or equal to the viewing angle of the sensor. Accordingly, the viewing zone of the sensor 110 may not violate the privacy protection zone.

The description describes the method of adjusting the heading direction for the azimuth of the privacy protection zone to be greater than or equal to the viewing angle in the above example in detail with reference to FIGS. 5A to 5C below.

Referring to FIG. 5A, the processor 140 according to one or more embodiments may identify the azimuth of the privacy protection zone 10 based on the heading direction of the robot 100 while the robot 100 travels in a scenario where a viewing zone 530 of the sensor 110 is identified as approaching within the predetermined distance from the privacy protection zone 10. For example, the processor 140 may identify, as an azimuth 520 of the privacy protection zone, the minimum angle among the angles between any point in the privacy protection zone 10 and a heading direction 540 based on the first position information.

Here, according to one or more embodiments, the first position information is coordinate information corresponding to a position of the privacy protection zone 10 on the map of the travel space, and the processor 140 may identify the azimuth 520 based on the first position information of the privacy protection zone 10.

The reason why the minimum angle among the angles between any point in the privacy protection zone 10 and the heading direction 540 is identified as the azimuth 520 is that the privacy protection zone 10 may be positioned outside the viewing zone (or detection zone) of the sensor 110 only where the angle formed by any point in the privacy protection zone 10 with the heading direction 540 is greater than or equal to the viewing angle 510.

Referring to FIG. 5B, the processor 140 according to one or more embodiments may adjust the heading direction 540 of the robot 100 such that the azimuth 520 of the privacy protection zone 10 is greater than or equal to the viewing angle 510 of the sensor 110 based on the second position information of the viewing zone 530. Here, according to one or more embodiments, the second position information may be the coordinate information corresponding to a position of the viewing zone 530 on the map of the travel space, and the processor 140 may identify the viewing angle 510 of the viewing zone based on the second position information of the privacy protection zone 10, and adjust the heading direction 540 for the identified viewing angle 510 to be greater than or equal to the identified azimuth 520.

According to one or more embodiments, the processor 140 may adjust the heading direction 540 of the robot 100 for the minimum angle or the azimuth 520 among the angles between any point in the privacy protection zone 10 and the heading direction 540 to be greater than or equal to the viewing angle 510 of the sensor 110 in case of identifying that the azimuth of the privacy protection zone 10 before the heading direction is adjusted is less than the viewing angle 510 of the sensor 110.

That is, the privacy protection zone 10 may be positioned within the viewing zone of the sensor 110 in in a scenario where the azimuth 520 of the privacy protection zone is less than the viewing angle 510 of the sensor 110. Therefore, there is a probability that the robot 100 detects an image of the privacy protection zone 10, and the user in the privacy protection zone 10 may have anxiety that the robot 100 may capture (or detect) the privacy protection zone.

The privacy protection zone 10 may be out of the viewing zone of the sensor 110 in a scenario where the azimuth 520 of the privacy protection zone 10 is greater than or equal to the viewing angle 510. Therefore, the robot 100 may not travel toward the privacy protection zone or detect the privacy protection zone any longer. Accordingly, the robot 100 may provide the user in the privacy protection zone with its visible motion of traveling in a manner that avoids the privacy protection zone, and the user may feel safe that his or her privacy protection zone is protected.

Referring to FIG. 5C, according to one or more embodiments, the processor 140 may identify a range 550 of the heading direction 540 for the azimuth 520 to be greater than or equal to the viewing angle 510, and adjust the heading direction 540 based thereon.

According to one or more embodiments, the processor 140 may identify the possible travel range 550, or possible heading range of the robot 100 wherein the viewing zone does not violate the privacy protection zone. For example, the processor 140 may identify a range of the heading direction 540 where the azimuth 520 is greater than or equal to the viewing angle 510 as the possible travel range 550.

According to one or more embodiments, the processor 140 may identify the heading direction 540 in which the robot has a minimum travel time or travel distance within the identified possible travel range 550. Next, according to one or more embodiments, the processor 140 may adjust the heading direction of the robot 100 to the identified heading direction. Accordingly, the processor 140 may allow the robot 100 to travel along an optimal path while preventing the viewing zone from violating the privacy protection zone.

Figure 6:
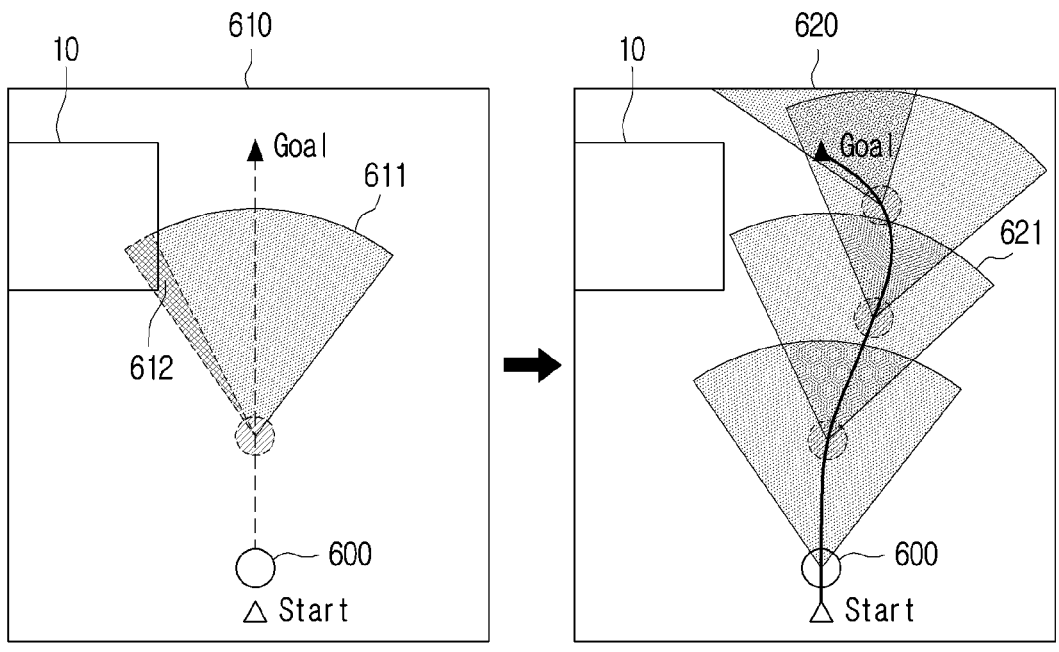
FIG. 6 is a view for explaining a method of controlling a driver in a scenario where the robot is implemented as a non-holonomic robot according to one or more embodiments.

FIG. 6 is a view for explaining a method of controlling a driver in case that the robot is implemented as a non-holonomic robot according to one or more embodiments.

According to one or more embodiments, the robot 100 may be implemented as the non-holonomic robot or a holonomic robot. Here, the holonomic robot is a robot in which the heading direction of the robot 100 is independent of its travel direction, and the heading direction and travel direction of the holonomic robot 100 may be different from each other. The non-holonomic robot is the robot 100 in which the heading direction of the robot 100 is constrained to the travel direction of the robot 100, and the heading direction and travel direction of the robot 100 may be the same as each other.

Referring to FIG. 6, according to one or more embodiments, the processor 140 may control the driver 120 for the robot 100 to travel in the adjusted heading direction in case that the robot 100 is implemented as the non-holonomic robot.

According to one or more embodiments, the robot 100 may be implemented as a non-holonomic robot 600 in which the sensor 110 is positioned on a non-rotatable head. According to one or more embodiments, the driver 120 may include a second driver that rotates a wheel of the robot 600, and the processor 140 may control the second driver to change a travel direction of the robot based on the adjusted heading direction. However, the sensor 110 is not limited thereto, and according to one or more embodiments, the sensor 110 may be positioned in one side of a body part of the robot 600 as well as the non-rotatable head.

For example, the processor 140 may first identify the short-term target point (or goal) in a travel path of the robot 600, and predict a viewing zone that is changed while the robot 600 travels to the short-term target point.

Next, the processor 140 may predict that a viewing zone 611 of the sensor 110 will violate the privacy protection zone 10 in a scenario 610 where a partial zone 612 of the predicted viewing zone 611 is identified as being included in the privacy protection zone 10.

Next, in a scenario 620 where the viewing zone 611 is predicted to violate the privacy protection zone 10, the processor 140 may identify the azimuth of the privacy protection zone based on a heading direction of the robot 600, and adjust the heading direction of the robot for the azimuth of the privacy protection zone to be greater than or equal to the viewing angle of the sensor 110. In this case, the processor 140 may identify the heading direction in which the robot has the minimum travel time or travel distance within the possible travel range, and adjust the heading direction of the robot 600 to the identified heading direction.

Next, the processor 140 may control the second driver to change the travel direction of the robot 600 based on the adjusted heading direction.

Accordingly, the robot 600 may travel to the target point while a viewing zone 621 of the robot 600 is not included in the privacy protection zone 10, and the viewing zone 621 of the sensor 110 does not violate the privacy protection zone 10.

Figure 7:
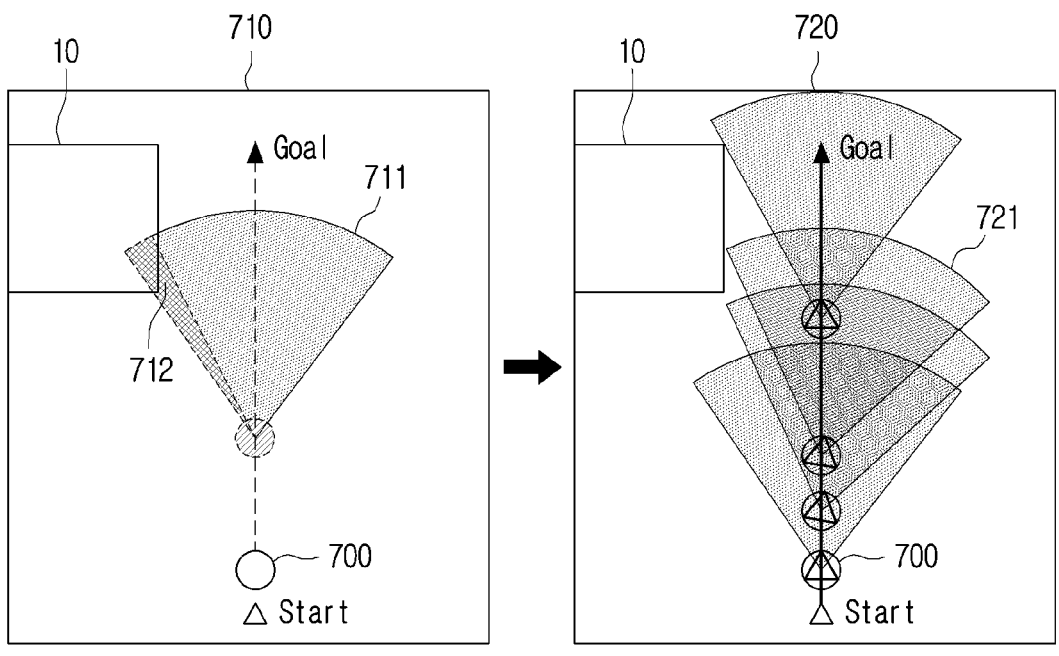
FIG. 7 is a view for explaining a method of controlling a driver in a scenario where the robot is implemented as a holonomic robot according to one or more embodiments.

FIG. 7 is a view for explaining a method of controlling the driver in case that the robot is implemented as the holonomic robot according to one or more embodiments.

Referring to FIG. 7, according to one or more embodiments, the processor 140 may control the driver 120 for a head of the robot 100 to be rotated based on the adjusted heading direction in case that the robot 100 is implemented as the holonomic robot. Here, the holonomic robot is the robot in which the heading direction of the robot 100 is independent of its travel direction, and the heading direction and travel direction of the holonomic robot 100 may be different from each other.

According to one or more embodiments, the robot 100 may be implemented as a holonomic robot 700 in which the sensor 110 is positioned in a rotatable head. According to one or more embodiments, the driver 120 may include a first driver that rotates the head of the robot 700, and the processor 140 may control the first driver to rotate the head of the robot 700 based on the adjusted heading direction while maintaining a travel path of the robot 700. However, the sensor 110 is not limited thereto, and according to one or more embodiments, the sensor 110 may be positioned in one side of a body part of the robot 700 as well as the rotatable head. That is, the holonomic robot 700 may have its heading direction and travel direction independent from each other, and according to one or more embodiments, the sensor 110 may be positioned on one side in the body part of the robot 700 in the heading direction of the robot 700.

For example, the processor 140 may first identify the short-term target point (or goal) in a travel path of the robot 700, and predict a viewing zone that is changed while the robot 700 travels to the short-term target point.

Next, the processor 140 may predict that a viewing zone 711 of the sensor 110 is to violate the privacy protection zone 10 in a scenario 710 where a partial zone 712 of the predicted viewing zone 711 is identified as being included in the privacy protection zone 10.

Next, in a scenario 720 where the viewing zone 711 is predicted to violate the privacy protection zone 10, the processor 140 may identify the azimuth of the privacy protection zone 10 based on the heading direction of the robot 700, and adjust the heading direction of the robot 700 for the azimuth of the privacy protection zone to be greater than or equal to the viewing angle of the sensor 110. In this case, the processor 140 may identify the heading direction in which the robot has the minimum travel time or travel distance within the possible travel range, and adjust the heading direction of the robot 700 to the identified heading direction.

Next, the processor 140 may control the first driver to rotate the head of the robot 700 based on the adjusted heading direction while maintaining the travel path of the robot 700. That is, unlike the non-holonomic robot 600 shown in FIG. 6, the holonomic robot 700 may have a heading direction of the robot and a travel direction of the robot that are independent from each other. Therefore, the holonomic robot 700 may adjust only the heading direction while maintaining the travel path.

Accordingly, the robot 700 may travel to the target point while a viewing zone 721 of the robot is not included in the privacy protection zone 10, and the viewing zone 721 of the sensor 110 does not violate the privacy protection zone 10.

Figure 8A:
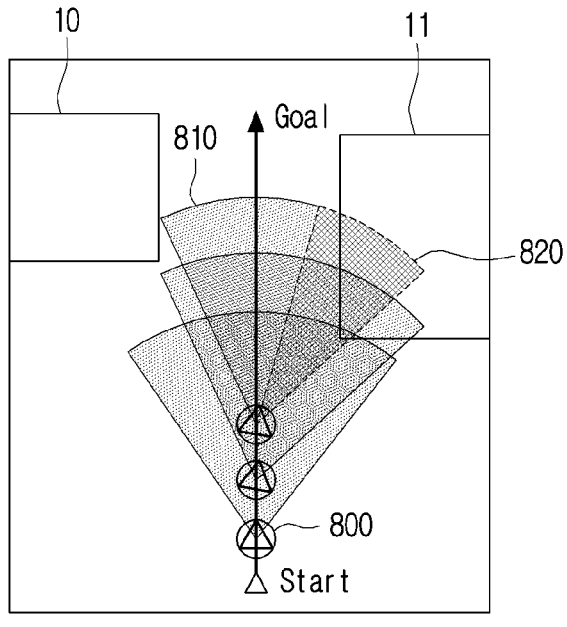
FIGS. 8A and 8B are views for explaining a control method of a robot in a scenario where the heading direction is unable to be adjusted according to one or more embodiments.
Figure 8B:
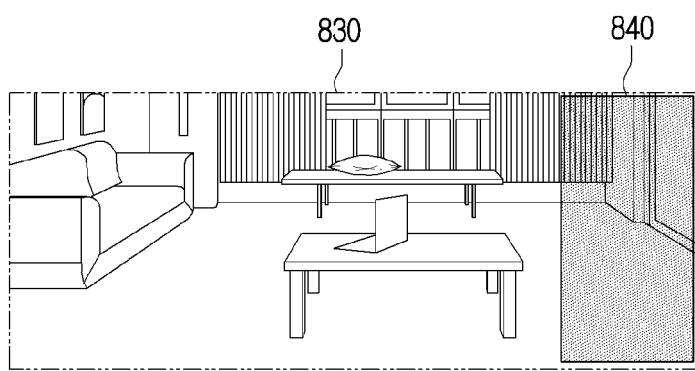

FIGS. 8A and 8B are views for explaining a control method of a robot in case that the heading direction is unable to be adjusted according to one or more embodiments.

Referring to FIGS. 8A and 8B, according to one or more embodiments, a robot 800 may further include a display. According to one or more embodiments, the processor 140 may process an image of the privacy protection zone and display the processed image of the privacy protection zone through the display in a scenario where a heading direction of the robot 800 is identified as impossible to be adjusted. Here, the image processing may be, for example, at least one of blur processing or deletion processing, but is not limited thereto.

According to one or more embodiments, the processor 140 may maintain the heading direction of the robot 800 in a scenario where the heading direction of the robot is identified as impossible to be adjusted for a viewing zone 810 of the sensor 110 not to violate the privacy protection zone 10 or a privacy protection zone 11, and process an image of the privacy protection zone in an image 830 captured while the robot 800 travels and display the processed image of the privacy protection zone 840 on the display.

For example, the processor 140 may first adjust the heading direction of the robot for the viewing zone 810 of the sensor 110 not to violate the first privacy protection zone 10. In this case, the processor 140 may identify the azimuth of the first privacy protection zone 10 based on the heading direction of the robot 800, and adjust the heading direction of the robot 800 for the azimuth of the first privacy protection zone 10 to be greater than or equal to the viewing angle of the sensor 110.

Next, the processor 140 may identify that the heading direction of the robot 800 is impossible to be adjusted such that the viewing zone 810 of the sensor 110 does not violate the second privacy protection zone 11 in a scenario where a specific zone 820 in the viewing zone 810 is identified as being included in the second privacy protection zone 11 after the heading direction is adjusted.

Next, the processor 140 may maintain the heading direction of the robot 800, and blur-process the second privacy protection zone 11 in the image 830 captured while the robot 800 travels, and display the blur-processed privacy protection zone 840 on the display.

However, the processor 140 is not limited thereto. According to one or more embodiments, the processor 140 may identify the heading direction in which the robot has the minimum travel time or travel distance within the identified possible travel range based on the first privacy protection zone 10 or the second privacy protection zone 11, and adjust the heading direction of the robot 800 to the identified heading direction.

Figure 9:
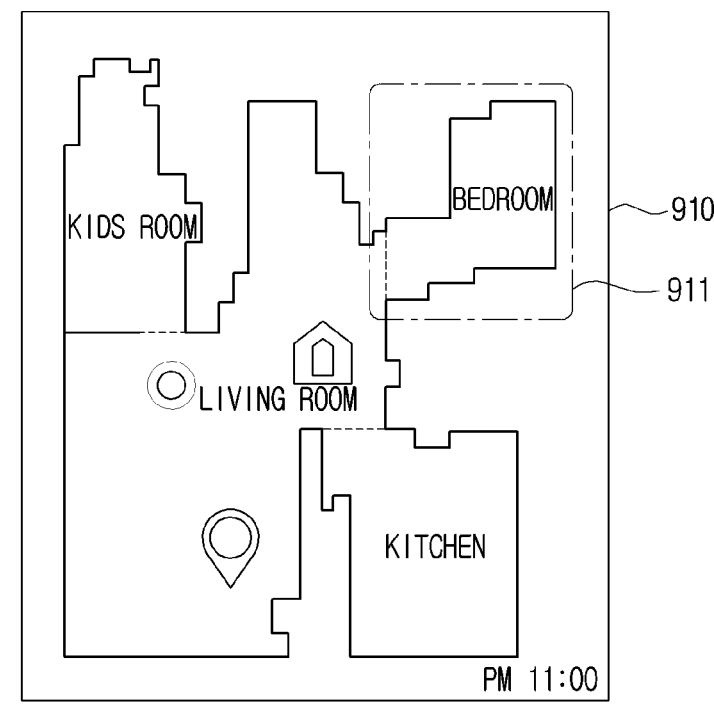
FIG. 9 is a view for explaining a method of updating a map of a travel space according to one or more embodiments.
Figure 9:
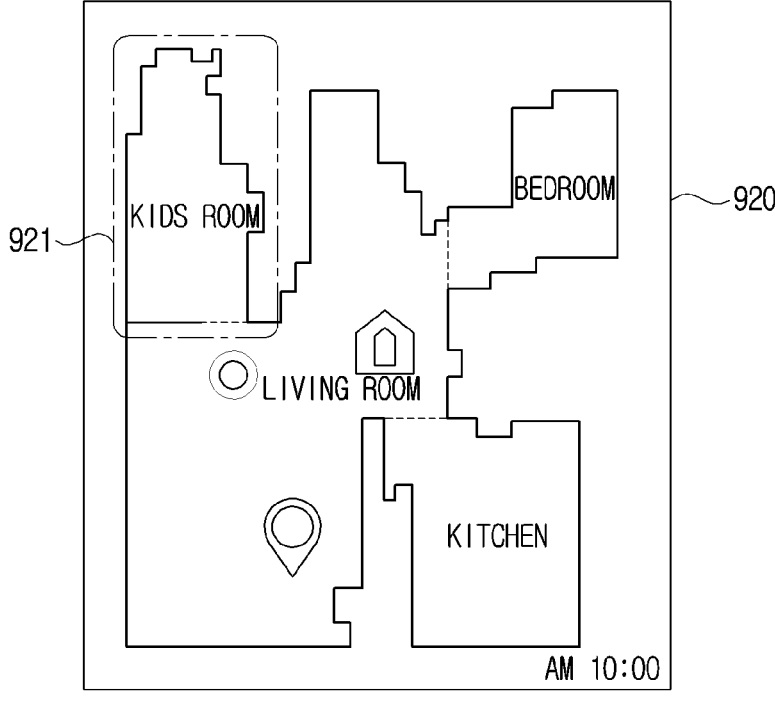

FIG. 9 is a view for explaining a method of updating the map of the travel space according to one or more embodiments.

According to one or more embodiments, the map information on the travel space may include the information on the privacy protection zone. According to one or more embodiments, the processor 140 may update the map information on the travel space for the privacy protection zone to be included in the map of the travel space based on a received signal in where the signal corresponding to the privacy protection zone is received from the user through the user interface or the communication interface.

Alternatively, according to one or more embodiments, the processor 140 may update the map of the travel space based on a user setup history. Here, the user setup history may be history information of the privacy protection zone setup by the user for a specific time period. According to one or more embodiments, information on the user setup history may be stored in the memory 130.

According to FIG. 9, according to one or more embodiments, the processor 140 may identify a privacy protection zone 911 or 921 for the specific time period based on the user setup history for the privacy protection zone, and update the map 910 of the travel space for the map 910 to include the identified privacy protection zone 911 or 921 for the specific time period.

For example, the processor 140 may first identify that the user sets up the specific zone 911 including the bedroom a predetermined number of times or more during a specific time period of 10:00 P.M. to 06:00 A.M. based on the information on the user setup history stored in the memory 130. In this case, the processor 140 may identify the specific zone 911 including the bedroom as the privacy protection zone for the above-described time period of 10:00 P.M. to 06:00 A.M. based thereon. Here, the predetermined number of times may be a value stored during the initial setup, is not limited thereto, and may be changed based on the user input.

Next, the processor 140 may update the map 910 for the map 910 of the travel space to include the identified privacy protection zone 910 for the above-described time period of 10:00 P.M. to 06:00 A.M.

Alternatively, for example, the processor 140 may first identify that the user sets up a specific zone 921 including the kids room a predetermined number of times or more for a specific time period of 07:00 A.M. to 11:00 A.M. based on the information on the user setup history stored in the memory 130. In this case, the processor 140 may identify the specific zone 921 including the kids room as the privacy protection zone for the above-described time period of 07:00 A.M. to 11:00 A.M. based thereon.

Next, the processor 140 may update the map 920 for the map 920 of the travel space to include the identified privacy protection zone 921 for the above-described time period of 07:00 A.M. to 11:00 A.M. Accordingly, the processor 140 may update the map 920 of the travel space based on the privacy protection zone for the time period, thereby improving user satisfaction.

Returning to FIG. 2, according to one or more embodiments, the robot 100 may further include a light emitter. The light emitter is a member that emits light of a specific wavelength. According to one or more embodiments, the processor 140 may control a light emitter to emit light for distinguishing the viewing zone of the sensor 110 from the other zones.

According to one or more embodiments, the processor 140 may first identify an emission angle for emitting light to a floor zone corresponding to the viewing zone of the sensor 110. For example, the processor 140 may identify the floor zone corresponding to the viewing zone based on information on the viewing zone or the second position information of the viewing zone, stored in the memory 130, and identify the emission angle for emitting light to the identified floor zone. Here, the information on the viewing zone may be information on the size (or range) of the viewing zone, and may be, for example, information on a radius of the sector and a size of its central angle in case that the viewing zone has the sector shape.

Next, according to one or more embodiments, the processor 140 may control the light emitter to emit light for distinguishing the viewing zone of the sensor 110 from the other zones at the identified emission angle.

According to the above-described embodiment, the user may see the viewing zone of the sensor 110, and the user satisfaction may thus be improved.

According to one or more embodiments, the robot 100 may further include a speaker, and the processor 140 may control the speaker to provide privacy violation notification in case that the viewing zone of the sensor 110 is identified as approaching within the predetermined distance from the privacy protection zone.

According to one or more embodiments, the processor 140 may predict whether the viewing zone of the sensor 110 is to violate the privacy protection zone in a scenario where the viewing zone of the sensor 110 approaches within the predetermined distance from the privacy protection zone based on the travel path of the robot 100.

Next, the processor 140 may control the speaker to provide the privacy violation notification in a scenario where the viewing zone of the sensor 110 is predicted to violate the privacy protection zone based on the travel path of the robot 100. In this case, the processor 140 may adjust the heading direction of the robot 100 for the viewing zone of the sensor 110 not to violate the privacy protection zone.

Accordingly, the user may know in advance whether the robot 100 is to violate the privacy protection zone, and the user anxiety may thus be relieved.

Figure 10:
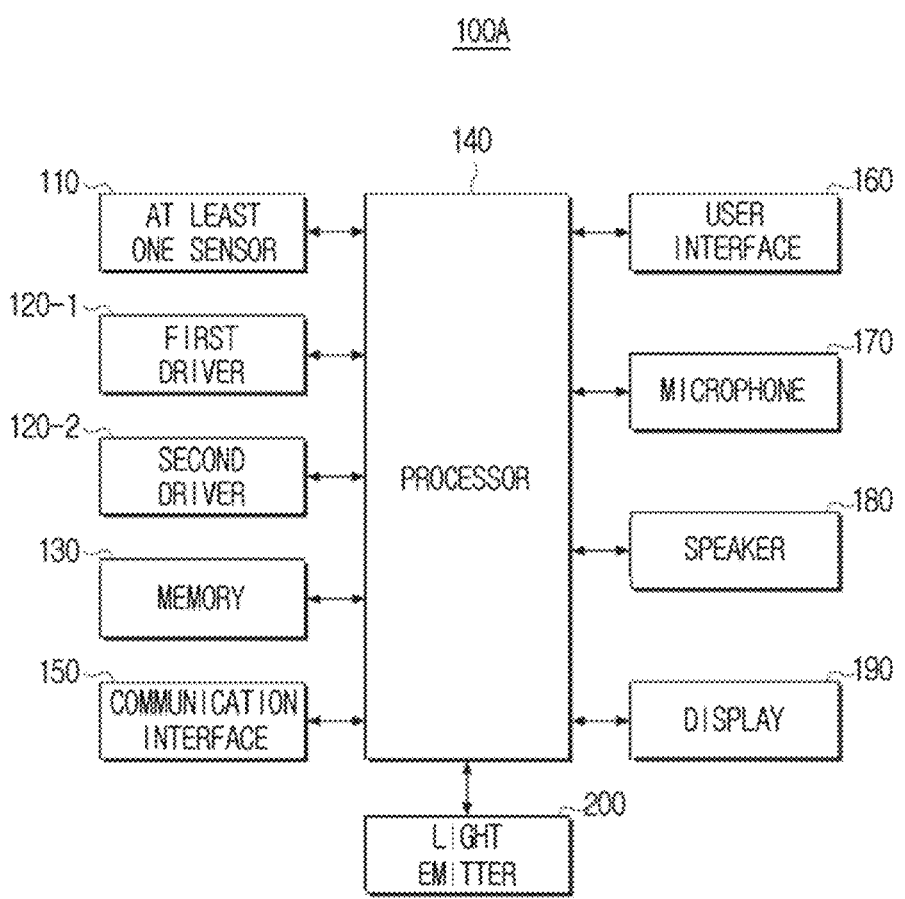
FIG. 10 is a block diagram showing a detailed configuration of a robot according to one or more embodiments.

FIG. 10 is a block diagram showing a detailed configuration of a robot according to one or more embodiments.

Referring to FIG. 10, a robot 100A may include at least one sensor 110, a first driver 120-1, a second driver 120-2, a memory 130, a processor 140, a communication interface 150, a user interface 160, a microphone 170, a speaker 180, a display 190, and a light emitter 200. The description omits detailed descriptions of components overlapping the components shown in FIG. 2 among the components shown in FIG. 10.

The communication interface 150 may receive various types of contents. For example, the communication interface 150 may receive a signal in a streaming or downloading manner from an external device (e.g., source device), an external storage medium (e.g., universal serial bus (USB) memory), an external server (e.g., web hard) or the like by using a communication method such as an access point (AP) based wireless fidelity (Wi-Fi, i.e. wireless local area network (LAN)), a Bluetooth, a Zigbee, a wired/wireless local area network (LAN), a wide area network (WAN), Ethernet, an IEEE 1394, a high definition multimedia interface (HDMI), a USB, a mobile high-definition link (MHL), an audio engineering society/European broadcasting union (AES/EBU) communication, an optical communication or a coaxial communication.

The user interface 160 may be implemented as a device such as a button, a touch pad, a mouse, or a keyboard, or may be implemented as a touch screen, a remote control transceiver, or the like, which may perform the above-described display function and a manipulation input function together. The remote control transceiver may receive/transmit a remote control signal from/to an external remote control device through at least one of infrared communication, Bluetooth communication, or Wi-Fi communication.

The microphone 170 may indicate a module that acquires audio and converts the same into an electrical signal, and may be a condenser microphone, a ribbon microphone, a moving coil microphone, a piezoelectric element microphone, a carbon microphone, or a micro electro mechanical system (MEMS) microphone. In addition, the microphone may be implemented using an omni-directional method, a bi-directional method, a uni-directional method, a sub-cardioid method, a super-cardioid method, or a hyper-cardioid method.

The speaker 180 may include a tweeter for high-pitched audio playback, a midrange for mid-range audio playback, a woofer for low-pitched audio playback, a subwoofer for extremely low-pitched audio playback, an enclosure for controlling resonance, a crossover network that divides a frequency of the electrical signal input to the speaker for each band, or the like.

The speaker 180 may output an audio signal to the outside of the robot 100A. The speaker 180 may output multimedia playback, recording playback, various notification sounds, voice messages, or the like. The robot 100A may include an audio output device such as the speaker 180, or an output device such as an audio output terminal. In particular, the speaker 180 may provide acquired information, processed/produced information based on the acquired information, a response result to a user voice, an operation result to the user voice, or the like, in the form of voice.

The display 190 may be implemented as a display including a self-light emitting element or a display including a non-self-light emitting element and a backlight. For example, the display may be implemented in various types of displays such as a liquid crystal display (LCD), an organic light emitting diode (OLED) display, a light emitting diode (LED) display, a micro light emitting diode (micro LED) display, a mini LED display, a plasma display panel (PDP), a quantum dot (QD) display, a quantum dot light-emitting diode (QLED) display. The display 190 may also include a driving circuit, a backlight unit, or the like, which may be implemented in a form such as an a-si thin film transistor (TFT), a low temperature poly silicon (LTPS) TFT, an organic TFT (OTFT), or the like. The display 190 may be implemented as a touch screen combined with a touch sensor, a flexible display, a rollable display, a three-dimensional (3D) display, a display in which a plurality of display modules are physically connected with each other, or the like. The processor 140 may control the display 190 to output an acquired output image according to various embodiments described above. Here, the output image may be a high-resolution image of 4K, 8K or higher.

According to the various embodiments described above, the robot 100 may adjust the heading direction to avoid the privacy protection zone, and provide the user with the visible privacy protection motion of the robot, thereby securing the user reliability.

The methods according to the various embodiments of the disclosure described above may be implemented in the form of applications which may be installed in a conventional robot. Alternatively, the methods according to the various embodiments of the disclosure described above may be performed using a deep learning-based learned neural network (or deep-learned neural network), that is, a learning network model. In addition, the methods according to the various embodiments of the disclosure described above may be implemented only by software upgrade or hardware upgrade for the conventional robot. In addition, the various embodiments of the disclosure described above may be performed through an embedded server positioned in the robot, or a server positioned outside the robot.

According to one or more embodiments of the disclosure, the various embodiments described above may be implemented by software including an instruction stored in a machine-readable storage medium (for example, a computer-readable storage medium). A machine may be an apparatus that invokes the stored instruction from the storage medium and may be operated based on the invoked instruction, and may include the display (e.g., display A) according to the disclosed embodiments. In the case in which the instruction is executed by the processor, the processor may directly perform a function corresponding to the instruction or other components may perform the function corresponding to the instruction under control of the processor. The instruction may include codes provided or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

In addition, according to other embodiment, the methods according to the various embodiments described above may be included and provided in a computer program product. The computer program product may be traded as a product between a seller and a purchaser. The computer program product may be distributed in a form of the machine-readable storage medium (for example, a compact disc read only memory (CD-ROM)) or online through an application store (for example, PlayStore™). In case of the online distribution, at least portions of the computer program product may be at least temporarily stored or temporarily provided in a storage medium such as a memory of a server of a manufacturer, a server of an application store or a relay server.

In addition, each of the components (for example, modules or programs) according to the various embodiments described above may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner. Operations performed by the modules, the programs or other components according to the various embodiments may be executed in a sequential manner, a parallel manner, an iterative manner or a heuristic manner, at least some of the operations may be performed in a different order or be omitted, or other operations may be added.

Although certain embodiments of the disclosure have been shown and described hereinabove, embodiments the disclosure is not limited to the abovementioned certain embodiments, and may be variously modified by those skilled in the art to which the disclosure pertains without departing from the scope and spirit of the disclosure as disclosed in the accompanying claims. These modifications should also be understood to fall within the scope and spirit of the disclosure.

What is claimed is:

1. A robot comprising:
at least one sensor configured to detect an external environment within a viewing zone of the at least one sensor;
at least one memory storing at least one instruction and information on a travel space comprising a privacy protection zone; and
at least one processor configured to execute the at least one instruction,
wherein the at least one instruction, when executed by the at least one processor individually or collectively, causes the robot to:
identify whether the viewing zone of the at least one sensor will be within a predetermined distance from the privacy protection zone while the robot travels along a travel path in the travel space,
based on identifying that the viewing zone of the at least one sensor will be within the predetermined distance, determine whether the viewing zone of the at least one sensor will overlap with the privacy protection zone based on the travel path, and based on determining that the viewing zone of the at least one sensor will overlap with the privacy protection zone, change a heading direction of the robot from a first heading direction to a second heading direction to prevent the viewing zone of the at least one sensor from overlapping with the privacy protection zone,
wherein the robot further comprises a first driver configured to rotate a portion of the robot in which the at least one sensor is provided, and
wherein the at least one instruction, when executed by the at least one processor individually or collectively, further causes the robot to control the first driver to rotate the portion of the robot to orient the at least one sensor in the second heading direction while maintaining the travel path of the robot.

2. The robot of claim 1, wherein the at least one instruction, when executed by the at least one processor individually or collectively, further causes the robot to:
based on identifying that the viewing zone of the at least one sensor will be within the predetermined distance, identify an azimuth of the privacy protection zone based on the heading direction of the robot while the robot travels, and
change the heading direction of the robot to cause the azimuth of the privacy protection zone to be greater than or equal to a viewing angle of the at least one sensor.

3. The robot of claim 2, further comprising a second driver configured to drive movement of the robot,
wherein the at least one instruction, when executed by the at least one processor individually or collectively, further causes the robot to control the second driver to change the travel path of the robot to correspond to the second heading direction.

4. The robot of claim 1, further comprising a light emitter,
wherein the at least one instruction, when executed by the at least one processor individually or collectively, further causes the robot to:
identify an emission angle for emitting light to an area corresponding to the viewing zone of the at least one sensor, and
control the light emitter to emit the light at the emission angle to the area corresponding to the viewing zone of the at least one sensor, for distinguishing the viewing zone of the at least one sensor from other zones.

5. The robot of claim 1, wherein the at least one instruction, when executed by the at least one processor individually or collectively, further causes the robot to:
identify the privacy protection zone based on a user setup history, and
update the information on the travel space to include the identified privacy protection zone during a specific time period included in the user setup history.

6. The robot of claim 1, further comprising a speaker,
wherein the at least one instruction, when executed by the at least one processor individually or collectively, further causes the robot to control the speaker to, based on identifying that the viewing zone of the at least one sensor will be within the predetermined distance, provide a privacy violation notification.

7. The robot of claim 1, further comprising a display,
wherein the at least one instruction, when executed by the at least one processor individually or collectively, further causes the robot to:

based on determining that the viewing zone of the at least one sensor will overlap with the privacy protection zone and determining that a change of heading direction will not prevent the viewing zone of the at least one sensor from overlapping with the privacy protection zone, control the robot to continue to move along the travel path, process an image obtained by the at least one sensor to obscure a portion of the image corresponding to the privacy protection zone, and display the processed image on the display.

8. The robot of claim 1, wherein the at least one sensor comprises at least one of a camera sensor, a time of flight (ToF) sensor, a thermal imaging sensor, or a light detection and ranging (LiDAR) sensor.

9. A method of controlling a robot, the method comprising:

identifying whether a viewing zone of at least one sensor of the robot will be within a predetermined distance from a privacy protection zone included in a travel space while the robot travels along a travel path in the travel space;

based on identifying that the viewing zone of the at least one sensor will be within the predetermined distance, determining whether the viewing zone of the at least one sensor will overlap with the privacy protection zone based on the travel path; and based on determining that the viewing zone of the at least one sensor will overlap with the privacy protection zone, changing a heading direction of the robot from a first heading direction of the robot to a second heading direction of the robot to prevent the viewing zone of the at least one sensor from overlapping with the privacy protection zone, wherein the changing the heading direction of the robot comprises:

based on identifying that the viewing zone of the at least one sensor is within the predetermined distance, identifying an azimuth of the privacy protection zone based on the heading direction of the robot while the robot travels; and changing the heading direction of the robot to cause the azimuth of the privacy protection zone to be greater than or equal to a viewing angle of the at least one sensor.

10. The method of claim 9, further comprising:

controlling a driver of the robot to rotate a portion of the robot in which the at least one sensor is provided to orient the at least one sensor in the second heading direction while maintaining the travel path of the robot.

11. The method of claim 9, further comprising:

controlling a driver of the robot to change the travel path of the robot to correspond to the second heading direction.

12. The method of claim 9, further comprising:

identifying an emission angle for emitting light to an area corresponding to the viewing zone of the at least one sensor; and emitting the light at the emission angle to the area corresponding to the viewing zone of the at least one sensor for distinguishing the viewing zone of the at least one sensor.

13. The method of claim 9, further comprising:

identifying the privacy protection zone based on a user setup history, and updating information on the travel space to include the identified privacy protection zone during a specific time period included in the user setup history.

14. The method of claim 9, further comprising:

based on identifying that the viewing zone of the at least one sensor is within the predetermined distance, providing a privacy violation notification through a speaker.

15. The method of claim 9, further comprising:

based on determining that the viewing zone of the at least one sensor will overlap with the privacy protection zone and determining that a change of heading direction will not prevent the viewing zone of the at least one sensor from overlapping with the privacy protection zone, controlling the robot to continue to move along the travel path, processing an image obtained by the at least one sensor to obscure a portion of the image corresponding to the privacy protection zone, and displaying the processed image on a display.

16. A non-transitory computer-readable medium storing instructions, which are executable by at least one processor cause the at least one processor to execute a method of controlling a robot, the method comprising:

identifying whether a viewing zone of at least one sensor of the robot will be within a predetermined distance from a privacy protection zone included in a travel space while the robot travels along a travel path in the travel space;

based on identifying that the viewing zone of the at least one sensor will be within the predetermined distance, determining whether the viewing zone of the at least one sensor will overlap with the privacy protection zone based on the travel path;

based on determining that the viewing zone of the at least one sensor will overlap with the privacy protection zone based on the travel path, changing a heading direction of the robot from a first heading direction of the robot to a second heading direction to prevent the viewing zone of the at least one sensor from overlapping with the privacy protection zone;

identifying an emission angle for emitting light to an area corresponding to the viewing zone of the at least one sensor; and based on the identified emission angle, emitting the light at the emission angle to the area corresponding to the viewing zone of the at least one sensor for distinguishing the viewing zone of the at least one sensor.

17. The non-transitory computer-readable medium of claim 16, wherein the method further comprises:

controlling a driver of the robot to rotate a portion of the robot in which the at least one sensor is provided to orient the at least one sensor in the second heading direction while maintaining the travel path of the robot.

18. The non-transitory computer-readable medium of claim 16, wherein the method further comprises:

controlling a driver of the robot to change the travel path of the robot to correspond to the second heading direction.

* * * * *